United States Patent [19]

Thompson

[11] Patent Number: 4,715,960
[45] Date of Patent: Dec. 29, 1987

[54] METHOD FOR THE MODIFICATION OF POLYCARBONATE MEMBRANES, THE MEMBRANES PRODUCED BY SUCH METHOD AND THEIR USE

[75] Inventor: John A. Thompson, Wyoming, Canada

[73] Assignee: Exxon Research and Engineering Company, Florham Park, N.J.

[21] Appl. No.: 474,008

[22] Filed: Mar. 10, 1983

[51] Int. Cl.$^4$ ............................................. B01D 13/00
[52] U.S. Cl. ................................. 210/651; 210/654; 210/500.4
[58] Field of Search ............... 210/646, 500.2, 651, 210/640, 653, 654, 500.4; 264/232, 233; 427/245

[56] References Cited

U.S. PATENT DOCUMENTS

| | | | |
|---|---|---|---|
| 1,350,532 | 8/1920 | Wait | 210/500.2 |
| 3,004,904 | 10/1961 | Gregor et al. | 204/180 |
| 3,133,132 | 5/1964 | Loeb et al. | 264/49 |
| 3,133,137 | 5/1964 | Loeb et al. | 264/233 |
| 3,228,876 | 1/1966 | Mahon | 210/646 X |
| 3,632,404 | 6/1972 | Desaulniers et al. | 117/106 |
| 3,699,038 | 10/1972 | Boom | 210/23 |
| 3,737,042 | 6/1973 | Boom | 210/321 |
| 3,945,926 | 3/1976 | Kesting | 210/500 M |
| 4,032,309 | 6/1977 | Salemme | 55/158 |
| 4,048,271 | 9/1977 | Kesting | 264/41 |
| 4,080,743 | 3/1978 | Manos | 34/9 |
| 4,080,744 | 3/1978 | Manos | 34/9 |

FOREIGN PATENT DOCUMENTS

| | | |
|---|---|---|
| 158024 | 12/1976 | Japan . |
| 035493 | 3/1977 | Japan . |
| 090506 | 7/1977 | Japan . |
| 142595 | 11/1977 | Japan . |
| 1395530 | 5/1975 | United Kingdom . |

OTHER PUBLICATIONS

Nuclepore Catalog Lab 50, pp. 1, 2 and 19-21.
"Interactions of Nonaqueous Solvents with Textile Fibers—Part III–The Dynamic Shrinkage of Polyester Yarns in Organic Solvents", Rubnick et al., Textile Research Journal, Jun. 1973, pp. 316-325.
"Separation of Lime Inorganic Salts in Aqueous Solution by Flow, Under Pressure, Through Porous Cellulose Acetate Membranes", Sourerajan, I&EC Fundamentals, vol. 3, #3, Aug. 1964, pp. 206-210.

*Primary Examiner*—Frank Spear
*Attorney, Agent, or Firm*—Joseph J. Allocca

[57] ABSTRACT

Polycarbonate membranes are prepared for the selective separation of organic liquid mixtures, especially for the separation of ketone dewaxing solvents from dewaxed oil by preshrinking said membranes in presence of a class of solvents of solubility parameter values in the range of from 8.9 to 10 $(cal/cm^3)^{0.5}$, and which do not dissolve the membranes.

Preshrunk polycarbonate membranes, prepared by the method of the present invention, can be used for the selective separation of the various components in organic liquid mixtures such as, for the separation of dewaxing solvents from dewaxed oil, preferably the separation of ketone dewaxing solvents from dewaxed oil. The separation is based on a reverse osmosis technique whereby the solvent is permeated through the membrane under an applied pressure sufficient to overcome the osmotic pressure of the system. Applied pressures can vary from 50 up to 1,500 psi, depending on solution concentration. The separation can be carried out in the temperature range $-30°$ to about $+80°$ C., preferably about $-20°$ to about $+60°$ C.

10 Claims, No Drawings

METHOD FOR THE MODIFICATION OF POLYCARBONATE MEMBRANES, THE MEMBRANES PRODUCED BY SUCH METHOD AND THEIR USE

DESCRIPTION OF THE INVENTION

Polycarbonate membranes are prepared for the selective separation of organic liquid mixtures by preshrinking the polycarbonate membrane, prior to use as a separation membrane, by contacting said polycarbonate membrane with a class of solvents having solubility parameter values in the range from 8.9 to 10 $(cal/cm^3)^{0.5}$ and which do not dissolve the membrane.

Contact times on the order of from about one minute to several hours (one example employed 17 hours) may be employed, depending on the choice of solvents.

Commercial polycarbonates are generally polymeric combinations of bis-phenols (bifunctional phenols) linked together through carbonate linkages. They are manufactured by the reaction between a diphenyl carbonate and a dihydroxy aromatic compound or by phosgenation of dihydroxyl aromatics. Industrial polycarbonates are produced in various countries and sold under the trade names (LEXAN, MERLON, MAKRALON, JUPILON and PANLITE). They are commonly available having molecular weights up to about 35,000.

U.S. Pat. No. 4,048,271, here incorporated by reference, gives a detailed description of the background of polycarbonate membranes and also describes the preparation of a new polycarbonate membrane. This membrane has high void volume i.e. high porosity and can be prepared in asymmetric or symmetric form. It is claimed as being useful as microfiltration and ultrafiltration membrane and could also be used in electrophoresis. Further background on polycarbonates can be found in "Polycarbonates" by William F. Christopher and Daniel W. Fox, Reinhold Plastics Applications Series, Reinhold Publishing Corp., N.Y. 1962. (pgs. 147-149 dealing with membranes).

The invention of the present application renders the prior art polycarbonate membranes useful for organic liquid separations by preshrinking the membrane to reduce its pore size. The tightest commercially available polycarbonate membrane has about 150 Å average pore size, which is too large for the selective separation of organic liquids from mixtures of the same, especially ketone dewaxing solvents from dewaxed oil. The membrane pores must therefore be reduced, to be selective for organic liquid separations in particular ketones dewaxed oil mixtures. It has been discovered that this can be accomplished by contacting the polycarbonate membrane with any of a class of solvents having solubility parameter values of 8.9 to 10 $(cal/cm^3)^{0.5}$. Solubility parameter values for a very extensive number of solvents can be found in Polymer Handbook (second edition) J. Brandrup, E. J. Immerent, Editors, John Wiley & Sons; N.Y. 1975 (Section IV—337 Solubility Parameters Values). Contacting may be conducted by immersion, dipping, flow of the solvent over the membrane, etc. Contact times may range from about a minute to an hour or more, depending on the solvent selected for preshrinking. This procedure may be conducted at temperatures up to the boiling point of to the solvent, but temperatures in the range of 10°-40° C. and even 20°-30° C. are preferred.

The polycarbonate membranes used to demonstrate this invention were obtained from Nuclepore Corporation. They were all 12 microns (0.47 mil) thick and were symmetrical membranes without backing. The polycarbonate membrane used is a polymer film which has been bombarded with radiation to track etch the membrane. The tracks are then alkali leached to create pores.

In general, polycarbonate membranes possess typical thickness in the range of about 0.1 to 10 mils. The lower thickness limit is imposed by the difficulties of handling fragile films. Thinner membrane films could probably be used if employed in conjunction with a backing such as Dacron (woven or nonwoven). Asymmetric polycarbonate membrane are also within the scope of the present invention.

The preshrunk polycarbonate membranes, prepared by the procedure recited above, is useful for the selective separation of the various components in organic liquid mixtures, especially for the separation of dewaxing solvents from dewaxed oil preferably the separation of ketone, mixed ketone and mixed ketone/aromatic dewaxing solvents from dewaxed oil. The separation is based on a reverse osmosis technique whereby the solvent is permeated through the membrane under an applied pressure sufficient to overcome the osmotic pressure of the system. Applied pressures can vary from about 50 psi up to about 1,500 psi, depending on solution concentrations. The separation can be carried out in the temperature range of about −30 to about +80° C., preferably about −20° to about +60° C.

Any number of elements in whatever form can be arranged in parallel and/or in series as may be required to handle the volumes of dewaxing solvent/dewaxed oil involved and/or to achieve the desired level of solvent purity. The preconditioned membrane will typically be employed to supplement traditional solvent recovery processes such as distillation or stripping and will as such constitute a method for either debottlenecking or for increasing plant capacity or both. If desired, and if a high level of solvent purity is not required, solvent recovery using the preconditioned membranes of the present invention can be employed as a replacement for the traditional solvent recovery techniques.

Waxy hydrocarbon streams are solvent dewaxed employing any one of a number of different processes. Representative, non-limiting examples include solvent dewaxing processes employing indirect heat exchange in a scraped-surface chiller wherein waxy oil and solvent, at approximately the same temperature, are mixed in such a manner so as to effect complete and thorough solution of the oil in the solvent before being cooled or chilled. This solution is then cooled at a uniform, slow rate under conditions which avoid agitation of the solution as the wax precipitates out.

Another well-known method of solvent dewaxing involves conventional, incremental solvent addition. In this method, solvent is added to the oil at several points along a chilling apparatus. However, the waxy oil is first chilled with solvent until some wax crystallization has occurred and the mixture has thickened considerably. A first increment of solvent is introduced at this point in order to maintain fluidity, cooling continues and more wax is precipitated. A second increment of solvent is added to maintain fluidity. This process is repeated until the desired oil-wax filtration temperature is reached, at which point an additional amount of solvent is added in order to reduce the viscosity of the mixture to that desired for the filtration step. In this method the temperature of the incrementally added solvent should also be about the same as that of the wax/oil/solvent mixture at the point of introduction. If the solvent is introduced at a lower temperature, shock chilling of the slurry usually occurs, resulting in the formation of small and/or acicula shaped wax crystals with attendant poor filter rate.

Still another well-known process is the (DILCHILL) process wherein a waxy oil is introduced into an elongated, staged cooling zone or tower at a temperature above its cloud point and cold dewaxing solvent is incrementally introduced into said zone, along a plurality of points or stages therein, while maintaining a high degree of agitation so as to effect substantially instantaneous mixing of the solvent and wax/oil mixture as they progress through said zone and resulting in the precipitation of at least a portion of the wax present in the waxy oil. The basic concept is shown in U.S. Pat. No. 3,773,650 while a modification thereof which employs the aforementioned high agitation chilling zone augmented by a subsequent, separate and distinct scraped surface chilling zone is presented in U.S. Pat. No. 3,775,288, the disclosures of both of which are incorporated herein by reference.

Any solvent useful for dewaxing waxy hydrocarbon oil stocks may be used in the process of this invention provided the solvent is not such that will dissolve the polycarbonate membrane on prolonged exposure thereto. Representative examples of solvents which can be used are (a) the aliphatic ketones having from 3 to 6 carbon atoms, such as acetone, methyl ethyl ketone (MEK) and methyl isobutyl ketone (MIBK), and (b) mixtures of the aforesaid ketones with $C_6$–$C_{10}$ aromatics such as benzene, xylene and toluene. Preferred solvents are MEK/MIBK and MEK/Toluene.

The solvent dewaxing of any waxy hydrocarbon oil stock, preferably waxy petroleum oil stock or distillate fraction thereof, more preferably waxy lube oil, transformer oil, white oil or fuel oil stocks may be dewaxed employing any of the dewaxing processes previously recited or otherwise practiced in the art may be improved by using the membrane-solvent recovery process described here in the process of this invention.

Dewaxing solvent recovery using the preshrunk polycarbonate membrane is practiced by contacting the mixture of dewaxing solvent and dewaxed oil (after removal of the precipitated wax therefrom by liquid/solid separation procedures such as filtration, centrifugation, settling/decanting, etc.) with one side of the preshrunk polycarbonate membrane, under pressure sufficient to overcome the osmotic pressure of the solvent in the solvent/oil mixture, to form a permeate richer in the dewaxing solvent than the original mixture and a retentate leaner in the dewaxing solvent than the original mixture. The permeate dewaxing solvent recovered by this procedure can be recycled back to the dewaxing operation with the other process streams being handled in accordance with further processing procedures common in the art.

The preconditioned membrane may be employed in any convenient form including sheets, bundles of hollow fibers, tubes, etc. formed into elements, for example, sheet material fabricated into spiral wound element configuration as described in e.g. U.S. Pat. Nos. 3,417,870; 3,173,867; 3,367,594; 3,386,583; 3,397,790 or bundled hollow tube or fiber as described in U.S. Pat. No. 3,228,876.

In forming a spiral wound element it is believed that one would prefer to use a polycarbonate membrane with a backing such as DACRON, (a polyester) to ease handling, a permeate spacer cloth being placed between two such membranes. It is necessary in fabricating spiral wound elements to form various seals in order to define permeate and retentate channels. This can be accomplished using an adhesive, an example of which would be the polycarbonate polymer dissolved in a suitable high volatility solvent such as chloroform or methylene chloride, the adhesive being applied along the edge to be sealed and thereby forming a bond between layers of polycarbonate membranes and the edge of a permeate spacer, between such layers of polycarbonate membranes which bond itself comprises polycarbonate. It should also be possible to form seals between polycarbonate membranes by carefully wetting the edge of the membrane with a thin film of solvent such as choloroform. The wetted edge should stick to a separate piece of membrane forming a seal resistant to the ketone/oil system. Other techniques for bonding plastics can be found in the Handbook of Adhesive Bonding, Charles V. Eagle, Chapter 19, McGraw-Hill Book Co., 1973, wherein solvent cementing, hot gas welding and the use of adhesives is specifically described for polycarbonates.

EXAMPLE 1

This example shows that only solvents with a narrow range of solubility parameters can preshrink polycarbonates.

Table 1 provides a representative list of solvents, their solubility parameters, and the effect of the solvent on a polycarbonate membrane as percent shrinkage. The list is to be understood as being merely representative and not a definitive list of every useable solvent. The Table does, however, clearly indicate that in order for the solvent to have any effect on the polycarbonate it must have solubility parameter from 8.9 to 10 $(cal/cm^3)^{0.5}$. The evaluations were conducted at ambient temperature, about 22° C. The polycarbonate membrane tested had a pore diameter of about 150 Å. Solvents effective for preshrinking polycarbonate membranes are selected from those materials having the required solubility parameter.

TABLE 1

| SHRINKAGE OF POLYCARBONATE MEMBRANES | | |
|---|---|---|
| Solvent | Solubility Parameter $[cal/cm^3]^{0.5}$ | Effect on Polycarbonate Membrane (Shrinkage by Area) |
| Water | 23.4 | No change |
| Ethylene Glycol | 14.6 | No change |
| Mehanol | 14.5 | No change |
| Isopropyl Alcohol | 11.5 | No change |
| Amyl Alcohol | 10.9 | No change |
| Aniline | 10.3 | No change |
| Isoamyl Alcohol | 10.0 | No change |
| Nitrobenzene | 10.0 | Shrinkage |
| Acetone | 9.9 | 21.6% Shrinkage |
| Methylene Chloride | 9.7 | Dissolves |
| MEK | 9.3 | 19.6% Shrinkage |
| Chloroform | 9.3 | Dissolves |
| Benzene | 9.2 | Slowly shrinks |
| Tetrahydrofuran | 9.1 | Slowly dissolves |
| Ethyl Acetate | 9.1 | Shrinkage |
| Toluene | 8.9 | 19.6% shrinkage |
| Xylene | 8.8 | No change |
| Carbon Tetrachloride | 8.6 | No change |
| MIBK | 8.4 | No change |
| Heptane | 7.4 | No change |
| Hexane | 7.3 | No change |

TABLE 1-continued

SHRINKAGE OF POLYCARBONATE MEMBRANES

| Solvent | Solubility Parameter [cal/cm³] 0.5 | Effect on Polycarbonate Membrane (Shrinkage by Area) |
|---|---|---|
| Pentane | 7.0 | No change |
| Polycarbonate Membrane | 9.5–10.6 | |

EXAMPLE 2

This example shows that different pore membranes are generally shrunk to the same extent by the same solvent. Thus Table 2 compares the shrinkage of different pore size polycarbonate membranes when treated with different solvents. Again, it is clearly seen that when solvents with solubility parameters less than 8.9 e.g. MIBK (solubility parameter 8.4 [cal/cm³]$^{0.5}$) are used, polycarbonate does not shrink.

The solvents having solubility parameters in the range 8.9–10.0 [cal/cm³]$^{0.5}$ may be used either singly or as mixtures thereof or in combination with solvents having solubility parameters within or outside the prescribed range.

For example in Tables 2 and 3, the membrane shrinkage by pure solvent(s) and solvent-oil mixtures is shown. Pure oil and MIBK (having low solubility parameters) do not shrink the membrane alone but in mixtures with Methyl Ethyl Ketone (MEK) they do. Thus, a polycarbonate membrane can be mounted and shrunk in situ provided it is exposed to a solution containing at least one solvent having the necessary solubility parameter and provided the membrane does not tear in its mounting during shrinkage. Preshrinkage prior to exposure to the separation system is the preferred mode for the practice of the present invention. All the shrinkage treatments were carried out at ambient temperature and pressure, although as mentioned before, shrinkage can still occur at low or high temperatures. However, pressure is not expected to play any part in the treatment. Attempts have been made to carry out the treatment for one side of the membrane only, but were found impractical.

TABLE 2

EFFECTS OF VARIOUS SOLVENTS ON MEMBRANE SHRINKAGE
Temperature ambient, about 22° C. Shrinkage(1), Area % (Wet)

| Membrane | Pore, μm | Acetone | MEK | Benzene | Ethyl Acetate | Toluene | MIBK |
|---|---|---|---|---|---|---|---|
| Solubility Parameter [cal/cm³] 0.5 | | 9.9 | 9.3 | 9.2 | 9.1 | 8.9 | 8.4 |
| M-30 Polycarbonate | 0.0075 | 15.6 | 15.6 | 21.0 | 15.6 | 0 | 0 |
| M-10 Polycarbonate | 0.03 | 12.5 | 15.6 | 18.8 | 12.5 | 12.5 | 0 |
| M-11 Polycarbonate | 0.015 | 15.6 | 15.6 | 21.9 | 15.6 | 12.6 | 0 |
| M-13 Polycarbonate | 0.2 | 12.5 | 12.5 | 18.8 | 12.5 | 12.5 | 0 |
| M-12 Polycarbonate | 1.0 | 15.6 | 12.5 | 0 | 12.5 | 3.0 | 0 |
| M-124 Polycarbonate (hydrophobic) | 0.1 | 25.0 | 18.9 | 0 | 25.0 | 0 | 0 |

(1)All membranes were 12 μm thick before and after solvent treating.

TABLE 3

EFFECTS OF VARIOUS SOLVENTS ON MEMBRANE SHRINKAGE
Temperature ambient about 22° C.
Membrane polycarbonate 0.01 μm Pore

| Composition of Solvent Mixture | Shrinkage, Area % (Wet) |
|---|---|
| 600 N DWO (Pure) | 0 |
| MEK, Pure | 14 |
| MIBK, Pure | 0 |
| 50:50 Vol MEK/MIBK | 13.4 |
| 20% 600 N Oil in 50/50 MEK/MIBK | 13.2 |
| 40% 600 N Oil in 50/50 MEK/MIBK | 13.9 |

EXAMPLE 3

This example (Table 4) shows that very short contact times on the order of seconds is enough to bring about the desired shrinkage. The experiments were conducted at ambient temperature, about 23° C.

TABLE 4

EFFECTS OF VARIOUS SOLVENTS ON MEMBRANE SHRINKAGE
Time Required for Shrinkage (Seconds)

| Membrane | Pore, μm | Acetone | MEK | Benzene | Ethyl Acetate | Toluene | MIBK |
|---|---|---|---|---|---|---|---|
| M-30 Polycarbonate | 0.0075 | 6 | 20 | 82 | 20 | — | — |
| M-11 Polycarbonate | 0.015 | 8 | 11 | 58 | 11 | 23 | — |
| M-10 Polycarbonate | 0.03 | 7 | 10 | 37 | 10 | 25 | — |
| M-13 Polycarbonate | 0.2 | 8 | 12 | 80 | 20 | 60 | — |
| M-12 Polycarbonate | 1.0 | 7 | 20 | 0 | 23 | — | — |
| M-14 Polycarbonate | 0.1 | 12 | 21 | — | 35 | — | — |

In examples 1–3, the membrane shrinkage was free i.e. the membrane is allowed to freely shrink upon contact with solvent. However, the membrane could also be shrunk in situ, mounted in a piece of equipment in a constrained configuration. In this case, the membrane becomes effectively more tight than the former case as seen from the results in Table 5. In practice, however, a membrane should be preshrunk (preferred mode) to avoid excessive stress and possible tearing.

TABLE 5

COMPARISON BETWEEN PERFORMANCE
OF MEMBRANE SHRUNK UNDER
FREE AND CONSTRAINED CONDITIONS

| | |
|---|---|
| Membrane | Nuclepore N 0.01 (150Å Pore Size) |
| Feedstock: | 20 LV % 600 N (30 Grade) |
| Shrinking Procedure Feed: | Lube Oil Fraction in 80 LV % MEK(2)/MIBK(3) (30/70) |
| Temperature of Pretreatment | ambient, 22° C. |

TABLE 5-continued
COMPARISON BETWEEN PERFORMANCE OF MEMBRANE SHRUNK UNDER FREE AND CONSTRAINED CONDITIONS

|  | Constrained | | Free(1) | |
|---|---|---|---|---|
| Operating Conditions | | | | |
| Temperature, °C. | 23 | −13 | 23 | −10 |
| Pressure, kPa | | | 2857 | |
| Results | | | | |
| Permeate Composition, LV % Oil | 12.0 | 8.7 | 5.4 | 2.7 |
| Permeate Flux, l/m²/d | 170 | 80 | 90 | 15 |

(1)MEK soak for 2 hrs prior to mounting in test cell.
(2)MEK; Methyl Ethyl Ketone
(3)MIBK; Methyl Isobutyl Ketone

EXAMPLE 4

This example shows that proper shrinking using the right solvent and time of contact is essential to the successful use of polycarbonate membranes for organic liquid separations, as represented by the separation of ketone dewaxing solvent from dewaxed oil. Membranes are tested, some with no pretreatment, others with pretreatment using solvents which did not possess the needed solubility parameter and one which was pretreated in accordance with the teaching of the present invention. The results are presented in Table 6.

TABLE 6
PRETREATMENT OF 150Å POLYCARBONATE MEMBRANE, NUCLEPORE NO. 01
Feed Sol'n: 20 LV % 600 N (Lube Oil) in MEK/MIBK (30/70)

| Run No. | Membrane Pretreatment | Run Conditions | | Yield LV % | Product Oil In Permeate LV % |
|---|---|---|---|---|---|
| | | Temp °C. | Pressure psig | | |
| M-26 | None | 23 | 40 | 10 | 20 (1) |
| | | | 50 | | 20 (1) |
| M-31 | Water Then Methanol (non-shrinking solvent) | 23 | 40 | 5 | 19.5 (1) |
| | | | | 20 | 19.5 (1) |
| M-94 | None | 22 | 200 | 65 | 19.5 (1) |
| | | −17 | 200 | 77 | 12.0 (2) |
| | | −16 | 200 | 86 | 14.5 (2) |
| M-98 | MEK for 17 h (30% shrinkage) (ambient, ~22° C.) | −21 | 400 | 19 | 3.3 (2) |
| | | 21 | 400 | 60 | 3.2 (2) |
| | | 21 | 400 | 41 | 16.4 (1) |

(1) No stirring
(2) Stirring

It is readily seen that the untreated membrane or membrane treated with nonshrinking solvents [water, methanol] do not exhibit any selectivity, i.e., oil permeates through the membrane in an unrestricted fashion. The treated membrane, however, demonstrated a high degree of selectivity. It is also to be noted that even the untreated membrane (Run M-94) when exposed to the ketone/oil feed under turbulent conditions showed selectivity. This confirms the result of Table 5 and indicates that under the proper conditions polycarbonate membranes can be made selective in situ provided the feed stream contains at least one required solvent possessing the proper solubility parameter.

EXAMPLE 5

This example shows that different grade oils can be effectively separated from MEK/MIBK dewaxing solvents using pretreated polycarbonate membranes (Table 6). From the data it is clear that the ability of preshrunk polycarbonate membrane to separate ketone from oil is a general phenomenon, but obviously that the efficiency of the separation is greater for the heavier (larger molecular weight) oils (see the permeate oil content for the 2500N as compared to that for the 60N oil).

TABLE 7
KETONE-OIL SEPARATIONS USING TREATED POLYCARBONATE MEMBRANE
Operating Pressure: 400 psig Membrane: PC 0.015 (M-11)
Operating Temperature: −15° C.
Membrane Treat: 2 hrs in MEK at ambient 22° C.

| | Feed | Permeate Oil Content, LV % | Flux /m2/d |
|---|---|---|---|
| 30% | 60 N DWO in MEK/MIBK (50/50) | 14 | 90 |
| 30% | 150 N DWO in MEK/MIBK (50/50) | 10 | 55 |
| 20% | 600 N DWO in MEK/MIBK (50/50) | 4 | 27* |
| 20% | 2500 N DWO in MEK/MIBK (50/50) | 1.6 | 83 |

*low value probably due to poor mixing.

In addition, the preshrunk polycarbonate membranes prepared by the method of the present invention may be used for a variety of organic liquid separations provided the liquids to be separated do not dissolve the membrane, satisfy the size difference between molecules to separate and provide permeation for one species. Preferred separations are dewaxing solvents from dewaxed oil. Typical dewaxing solvents include $C_3$-$C_6$ ketone such as acetone, MEK, MIBK, aromatics such as toluene, benzene, etc., and mixtures thereof, such as MEK/Toluene. Tables 5–7 demonstrate the effectiveness of this pretreated membrane for such dewaxing solvent/dewaxed oil separations.

What is claimed is:

1. A method to render polycarbonate membranes selective for the separation of organic liquids, said method comprising preshrinking the polycarbonate membranes by contacting said membranes with a solvent having a solubility parameter in the range of 8.9–10 (cal/cm³) 0.5 said contacting being conducted for a time sufficient to result in shrinkage of the membrane but insufficient to result in dissolution of the membrane.

2. The method of claim 1 wherein the solvent is nitrobenzene, acetone, methyl ethyl ketone, benzene, tetrahydrofuran, ethyl acetate, toluene and mixtures thereof, either in the pure form or in combination with solvents having solubility parameters outside the prescribed range.

3. A polycarbonate membrane which is selective for the separation of ketone from oil prepared by preshrinking the polycarbonate membrane film by contacting said membrane film with a solvent having a solubility parameter in the range 8.9–10 (cal/cm³) 0.5, for a time sufficient to result in shrinkage of the film but not long enough to cause dissolution of the membrane.

4. The polycarbonate membrane of claim 3 wherein the solvent is nitrobenzene, acetone, methyl ethyl ketone, benzene, tetrahydrofuran, ethyl acetate, toluene and mixtures thereof, either in the pure form or in combination with solvents having solubility parameters outside the prescribed range.

5. A method for selectively separating organic liquids by the use of polycarbonate membrane prepared by the treatment method comprising contacting said membrane with a solvent having a solubility parameter in the range 8.9–10 (cal/cm$^3$) 0.5, said contacting being conducted for a time sufficient to result in shrinkage of the membrane but insufficient to result in dissolution of the membrane, wherein the organic liquids are separated by selective permeation through said polycarbonate membrane under conditions of temperature and pressure sufficient to effect said separation.

6. The method of claim 5 wherein the solvent is nitrobenzene, acetone, methyl ethyl ketone, benzene, tetrahydrofuran, ethyl acetate, toluene and mixtures thereof either in the pure form or in combination with non-solubilizing solvents.

7. The method of claim 5 or 6 wherein the organic liquids separated one from the other are dewaxing solvents from dewaxed oil.

8. The method of claim 7 wherein the dewaxing solvents separated from the dewaxed oil are ketones, and mixtures of ketones and aromatic hydrocarbons.

9. The method of claim 8 wherein the dewaxing solvents separated from the dewaxed oil are MEK, MIBK, MEK/toluene, MEK/MIBK.

10. The method of claim 5 or 6 wherein the pressure is sufficient to overcome the osmotic pressure.

* * * * *